(12) United States Patent
Kitamura

(10) Patent No.: US 8,214,985 B2
(45) Date of Patent: Jul. 10, 2012

(54) METHOD AND APPARATUS FOR CLAMPING RECTANGULAR PARALLELEPIPEDIC WORK

(75) Inventor: Akihiro Kitamura, Takaoka (JP)

(73) Assignee: Kitamura Machinery Co., Ltd. (JP)

( * ) Notice: Subject to any disclaimer, the term of this patent is extended or adjusted under 35 U.S.C. 154(b) by 0 days.

(21) Appl. No.: 13/204,773

(22) Filed: Aug. 8, 2011

(65) Prior Publication Data

US 2011/0291340 A1    Dec. 1, 2011

Related U.S. Application Data

(62) Division of application No. 12/385,174, filed on Apr. 1, 2009, now Pat. No. 8,015,679.

(30) Foreign Application Priority Data

May 23, 2008   (JP) ................................. 2008-135365

(51) Int. Cl.
*B23P 23/00* (2006.01)
*B23C 1/14* (2006.01)

(52) U.S. Cl. ........ 29/27 R; 409/165; 409/221; 279/137; 279/106; 269/71; 269/63

(58) Field of Classification Search ................. 29/27 C, 29/27 R; 409/165, 168, 219, 221, 224, 225; 269/43, 45, 57, 63, 71; 279/137, 106, 35, 279/109; 82/117, 118
See application file for complete search history.

(56) References Cited

U.S. PATENT DOCUMENTS

| | | | |
|---|---|---|---|
| 3,361,033 A | 1/1968 | Muller | |
| 4,529,342 A | 7/1985 | Babel | |
| 4,555,844 A | 12/1985 | Palfery et al. | |
| 4,856,178 A | 8/1989 | Salvagnini | |
| 5,781,983 A | 7/1998 | Gruner | |
| 5,895,059 A * | 4/1999 | Patterson | 279/106 |
| 6,070,312 A * | 6/2000 | Mantovani | 29/50 |
| 6,279,889 B1 | 8/2001 | Tikhonov | |
| 6,626,075 B2 * | 9/2003 | Hirose et al. | 82/118 |
| 6,938,312 B2 | 9/2005 | Kitaura | |
| 6,983,527 B2 | 1/2006 | Lanvin | |
| 6,993,821 B2 | 2/2006 | Ahti et al. | |
| 8,015,679 B2 * | 9/2011 | Kitamura | 29/27 C |
| 2002/0078541 A1 * | 6/2002 | Ohmori et al. | 409/165 |
| 2005/0223530 A1 * | 10/2005 | Ferrari | 29/38 B |

FOREIGN PATENT DOCUMENTS

| | | | |
|---|---|---|---|
| EP | 0 032 890 | | 7/1981 |
| JP | 61-121848 | | 6/1986 |
| JP | 61-226242 A | * | 10/1986 |
| JP | 64-045589 | | 2/1989 |
| JP | 08-155768 | | 6/1996 |
| JP | 2006-001111 | | 1/2006 |

\* cited by examiner

*Primary Examiner* — Erica E Cadugan

(74) *Attorney, Agent, or Firm* — Bacon & Thomas, PLLC

(57) ABSTRACT

A rectangular parallelepipedic (cuboidal) work is fixed by clamping the opposing two edges between clamp jaws attached to a pair of clamps. With the work fixed, at least one surface of the work is machined. Then, the position of the work is changed by rotating the clamps and the work all together around the rotating axis, and the other surface is machined. The foregoing step is repeated to machine all the six surfaces of the work, during which the work is kept fixed by clamping.

3 Claims, 7 Drawing Sheets

(A)

(B)

METHOD AND APPARATUS FOR CLAMPING RECTANGULAR PARALLELEPIPEDIC WORK

This application is a divisional of U.S. application Ser. No. 12/385,174, now U.S. Pat. No. 8,015,679, filed Apr. 1, 2009, and for which priority is claimed under 35 USC §120 of which the entire disclosure of the pending prior application is hereby incorporated by reference, and claims the right of priority of Japanese Patent Application No. 2008-135365, filed May 23, 2008.

BACKGROUND OF THE INVENTION

1. Field of the Invention

The present invention relates to a method and an apparatus for clamping a rectangular parallelepipedic work.

2. Description of the Related Art

A conventional method for machining a rectangular parallelepipedic (or cuboidal) work is illustrated in FIG. 7.

Shown in FIG. 7 is a cuboidal work M which has the upper surface S1, the lower surface S2, the left side S3, the rear surface S4, the right side S5, and the front surface S6.

In the first step of machining, the work M is attached to the table of a machining equipment (not shown), with its lower surface S2 facing downward, and then fixed to the table by clamping on its left side S3 and its right side S5.

The upper surface S1 undergoes milling by a vertical milling machine or a vertical machining center (not shown) so that the reference plane is formed.

The work M is reversed, with the upper surface S1 as the reference plane facing downward, and the upper surface S1 is fixed to the table, with both the left side S3 and the right side S5 clamped. The lower surface S2 undergoes milling.

The upper surface S1 is attached to the table of a horizontal milling machine or a horizontal machining center (not shown), and the left side S3 undergoes milling.

The work M is turned 90° and the right side S5 undergoes milling, with the left side S3 serving as the reference plane.

The work M is turned 90°, and both the rear surface S4 and the front surface S6 undergo milling in the same way as mentioned above. In this way milling on the six surfaces is completed.

The present applicant has proposed a machine tool capable of performing the above-mentioned machining. See Japanese Patent Laid-open No. 8-155768.

As mentioned above, the conventional method of machining a cuboidal work requires that the operator attaches and detaches the work each time one surface is machined.

The conventional method that requires the operator to attach and detach the work each time one surface is machined needs much labor and long time and is liable to variation in machining accuracy.

SUMMARY OF THE INVENTION

It is an object of the present invention to provide a method and an apparatus for machining the six surfaces of a cuboidal work in its fixed state once it has been fixed by clamping.

The present invention can obtain the following advantageous effects.

A method and apparatus according to a mode of the present invention permit one to machine the six surfaces of a cuboidal work with a single clamping operation. In other words, all they need is to fix the work by clamping once to machine the six surfaces of the work for rough machining and finish machining.

According to another mode of the present invention, the cuboidal work is fixed by clamping the opposing two edges with a pair of clamps. With the work fixed, at least one of the six surfaces is machined. Then, with the work fixed but its position changed, the other surface is machined by the same machine or different machine.

The foregoing step is repeated to machine all the surfaces of the cuboidal work, during which the work is kept fixed by clamping and the work and the clamps are turned all together. Thus the six surfaces of the cuboidal work can be machined once the work is clamped.

According to another mode for carrying out the invention, the cuboidal work is fixed by clamping the opposing edges of the work with clamp jaws of a clamping means. The cuboidal work in its fixed state has its one surface machined. Then the cuboidal work is turned to change it position and has its another surface machined. The step of changing the position and machining the surface for each position is repeated. In this way all the surfaces of the cuboidal work are machined while the work is clamped (without the necessity of unclamping the work).

Each clamping means has a pair of swing arms that work in cooperation with each of the paired clamp jaws. In other words, the paired clamping means has four swing arms in total. To firmly fix the cuboidal work, the paired clamp jaws push against the two opposing edges of the cuboidal work and any of the four swing arms presses down the cuboidal work.

The four swing arms are so designed as to move independently between the pressing position and the retreat position, so that any one of them can be retreated if it interferes with a working tool.

EMBODIMENTS

The preferred embodiments of the present invention will be described below with reference to the accompanying drawings.

Figure 1:
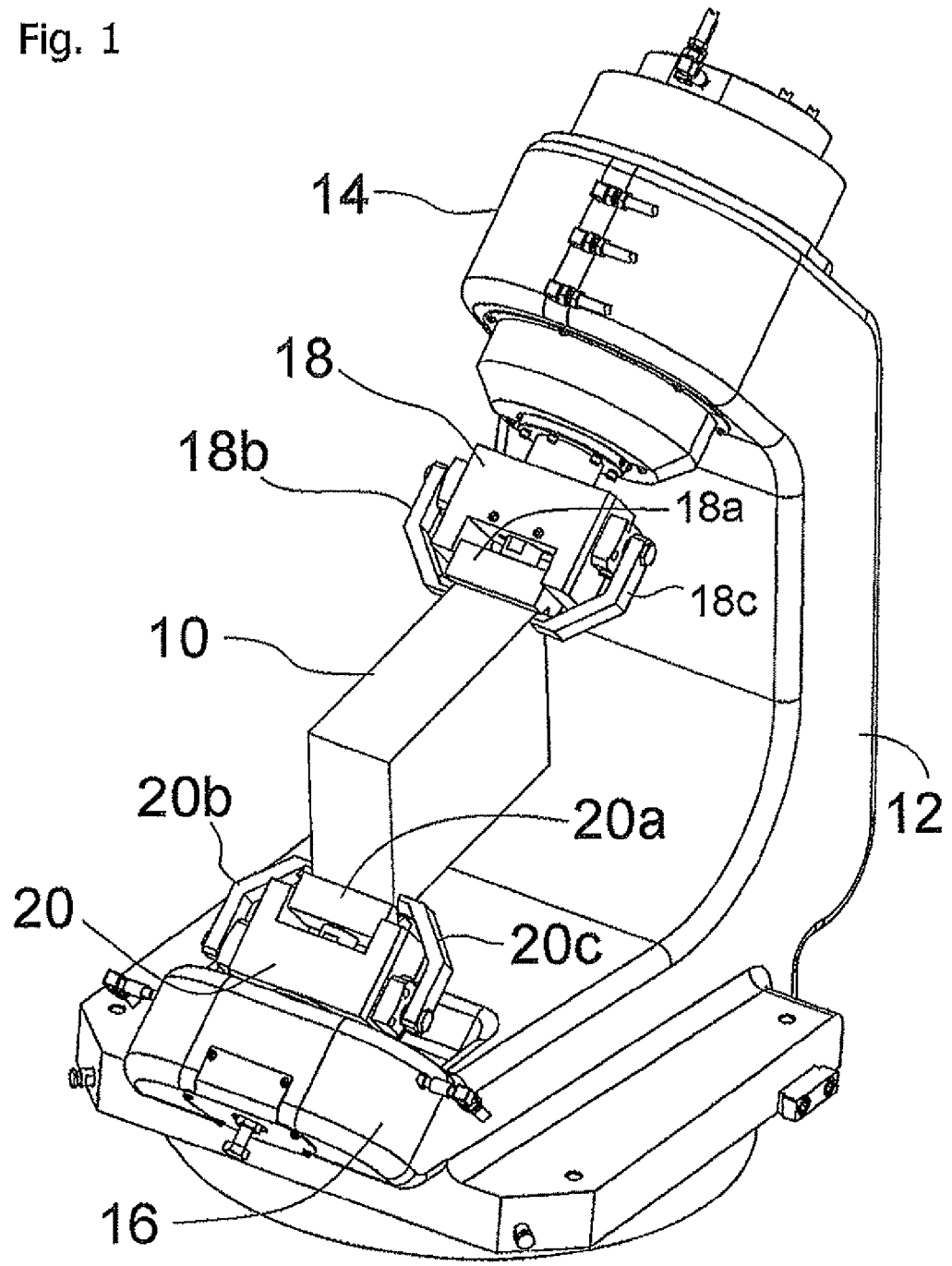
FIG. 1 is a schematic perspective view showing a clamping apparatus according to an embodiment of the present invention.

Shown in FIG. 1 is a cuboidal work 10 with 12 edges which is held by the clamping apparatus 12. The clamping apparatus 12 has two supports 14 and 16, which form a pair in the vertically diagonal direction. The supports 14 and 16 are provided with the clamping means 18 and 20, respectively, which are rotatable around the axis extending in the vertically diagonal direction.

The clamping means 18 and 20 are provided with the clamp jaws 18a and 20a, respectively, which form a pair. The clamping means 18 has a pair of swing arms 18b and 18c on its sides, and the clamping means 20 has a pair of swing arms 20b and 20c on its sides. In other words, the clamping means 18 and 20 have four swing arms in total.

Figure 2:
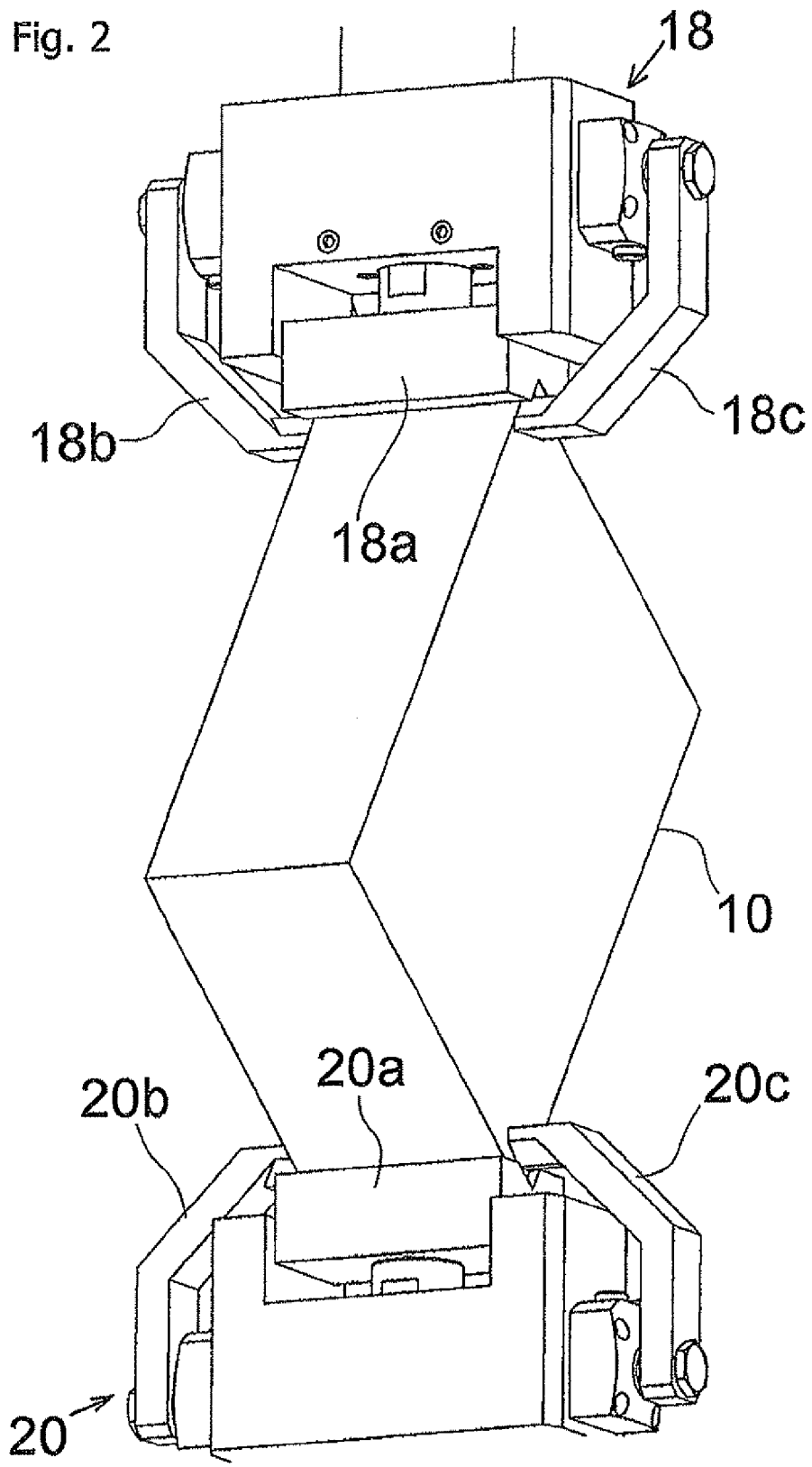
FIG. 2 is an enlarged schematic perspective view showing the clamping apparatus shown in FIG. 1.

As shown in FIG. 2 (which is an enlarged view), the work 10 is fixed by clamping with the paired clamping means 18 and 20 in such a way that the two opposing edges of the work 10 (the uppermost edge and the lowermost edge shown in FIG. 2) are held between the paired clamp jaws 18a and 20a. Each of the clamp jaws 18a and 20a should preferably have an engaging part that fits to the edge of the work 10. In other words, it has a V-shaped groove formed along its entire length. Thus the work 10 is clamped by the paired clamping means 18 and 20, with the opposing edges engaging with the V-shaped grooves.

The clamp jaws 18a and 20a should preferably be fixed with bolts to the prescribed positions of the clamping means 18 and 20.

Figure 3:
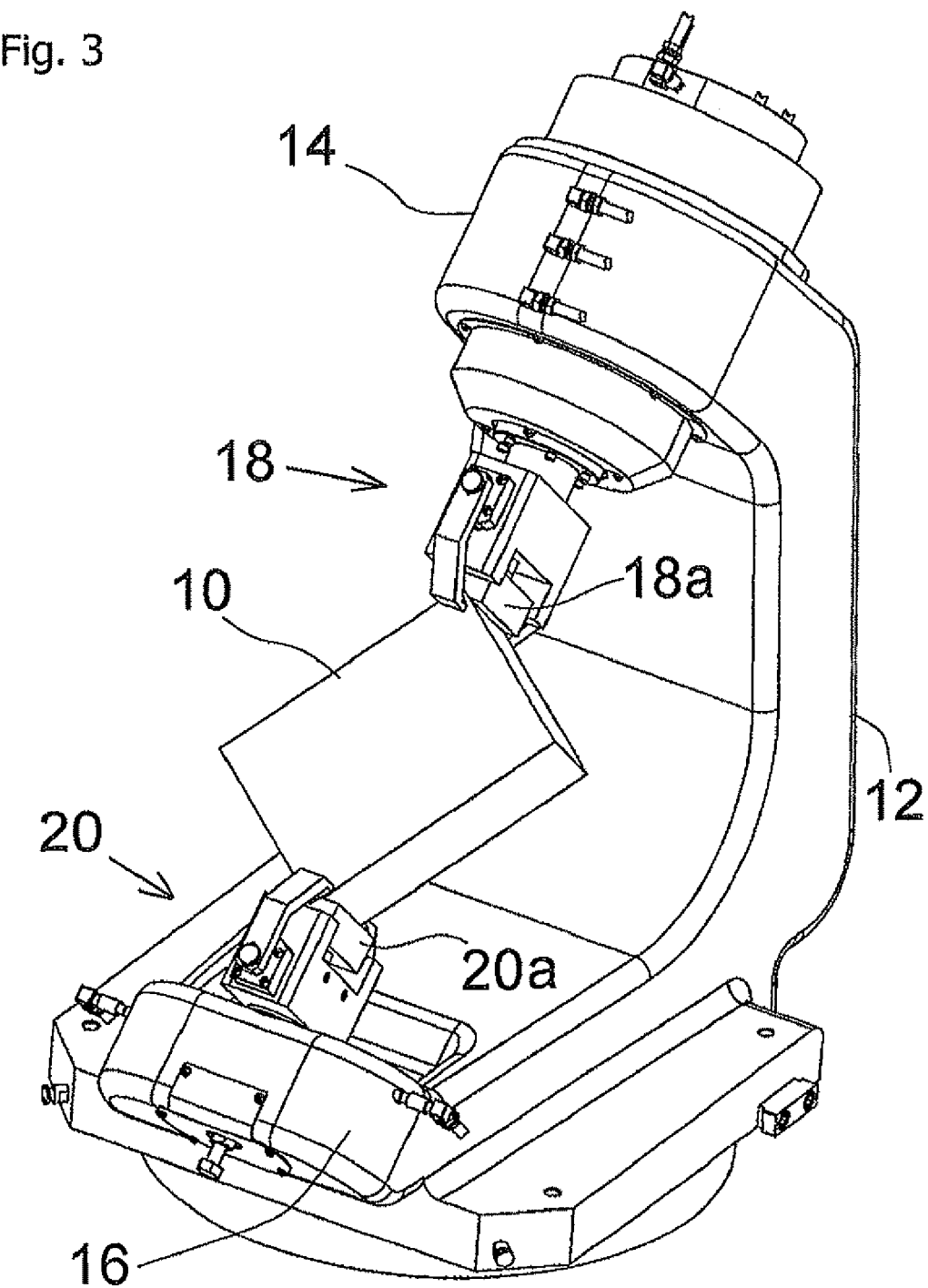
FIG. 3 shows a different mode of the clamping apparatus shown in FIG. 1, with the work turned 90° from the position shown in FIG. 1.

FIG. 3 shows how the clamped work 10 is turned around the vertically diagonal axis.

The upper and lower clamping means 18 and 20, which form a pair, turn 90° around the common axis with respect to the upper and lower supports 14 and 16, so that the work 10, which is held by the clamping means 18 and 20, turns 90° (from the position shown in FIGS. 1 and 2).

In actual operation, the work 10 and the paired clamping means 18 and 20 are turned together to a desired angle by the motor 24 (in FIG. 4) under control for indexing.

Figure 4:
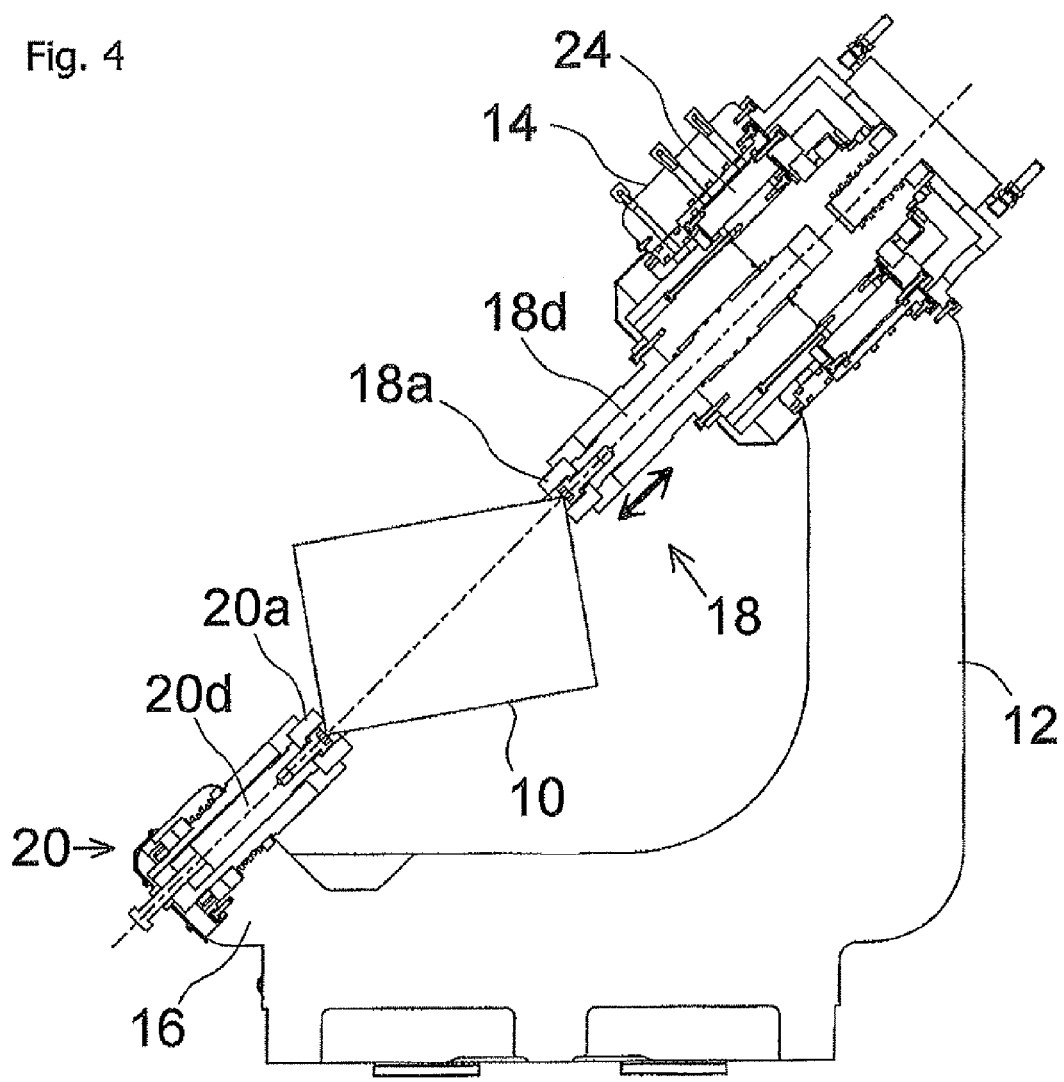
FIG. 4 is a schematic diagram showing the internal structure of the clamping apparatus shown in FIG. 1.

The clamp jaws 18a and 20a shown in FIG. 4 have the movable members 18d and 20d, respectively, which are capable of reciprocating within a prescribed range. The movable members 18d and 20d are hydraulically moved in the direction of arrow between the clamp position (shown in FIG. 4) and the unclamp position (not shown).

The paired clamp jaws 18a and 20a may be moved in the direction of arrow along the rotating axis between the clamp position (shown in FIG. 4) and the unclamp position (not shown) to mount or demount the work 10, according to need.

The upper support 14 has a built-in motor 24, which turns the clamping means 18 for indexing through a desired angle with respect to the support 14.

The lower support 16 has the clamping means 20 which is rotatably mounted.

Once the work 10 is firmly held between the paired clamping means 18 and 20 as shown in FIG. 4, the work 10 and the clamping means 18 and 20 turn together around the vertically diagonal rotating axis.

Figure 5:
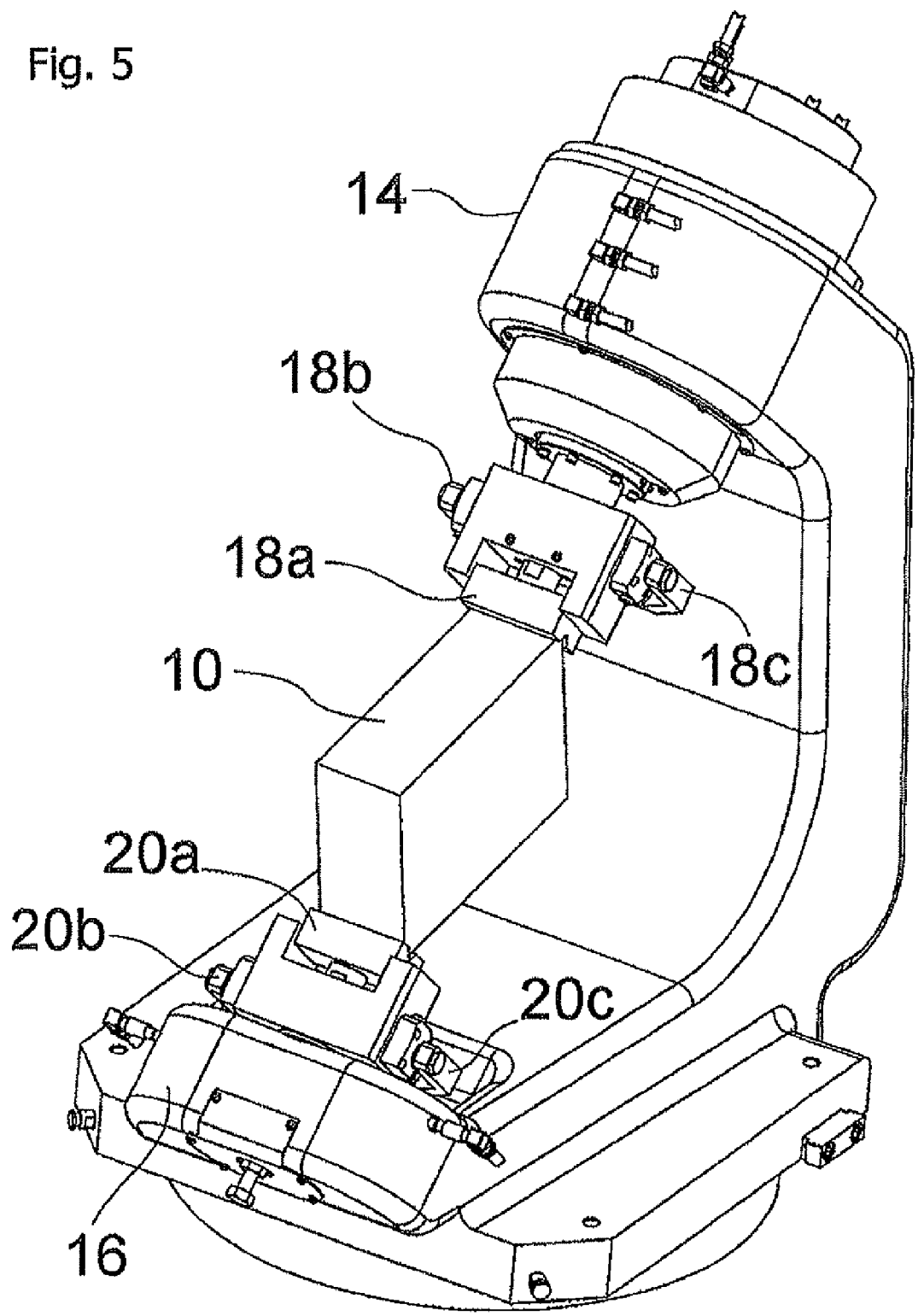
FIG. 5 shows still another mode of the clamping apparatus shown in FIG. 1, with all the four swing arms retreated.

The work 10 may be clamped only by the clamp jaws 18a and 20a as shown in FIG. 5. In this situation, all the swing arms 18b, 18c, 20b, and 20c retreat to the retreat position (which is 90° away from the pressing position).

Figure 6:
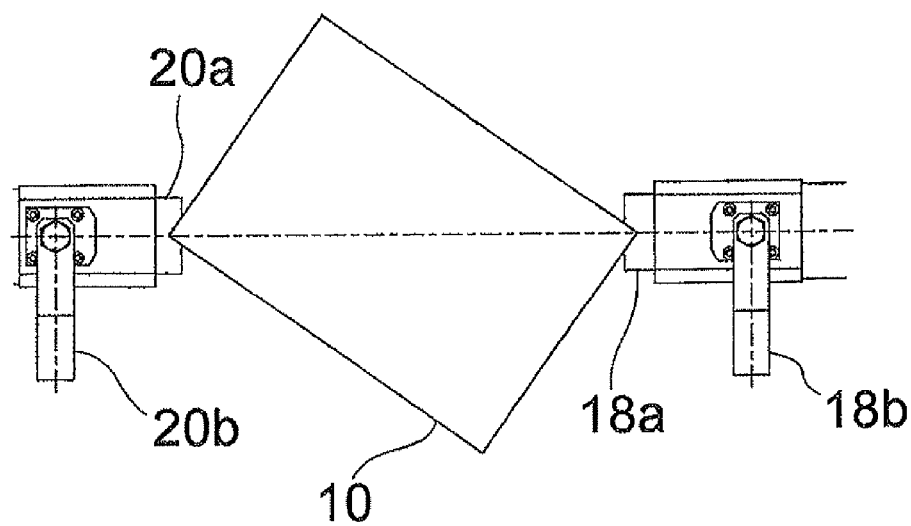
FIG. 6(A) shows the swing arms 18b and 20b at their retreat position (in the state shown in FIG. 5)
FIG. 6(B) shows the swing arms 18b and 20b at their pressing position (in the state shown in FIGS. 1 to 3)
Figure 6:
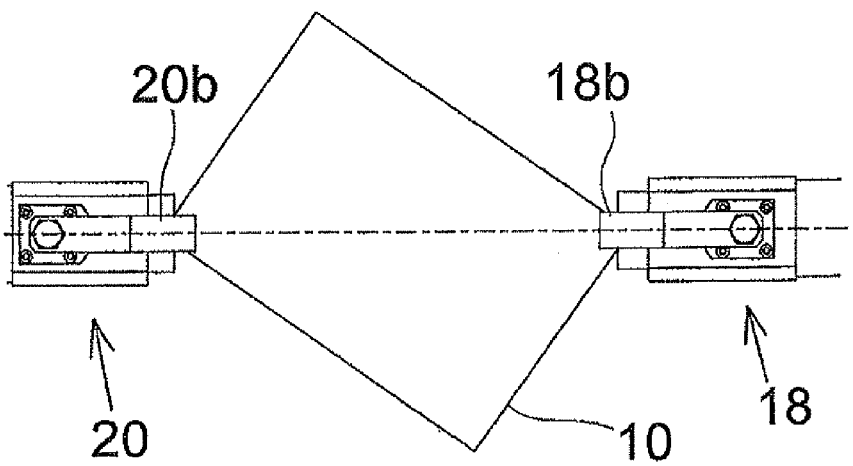
Figure 7:
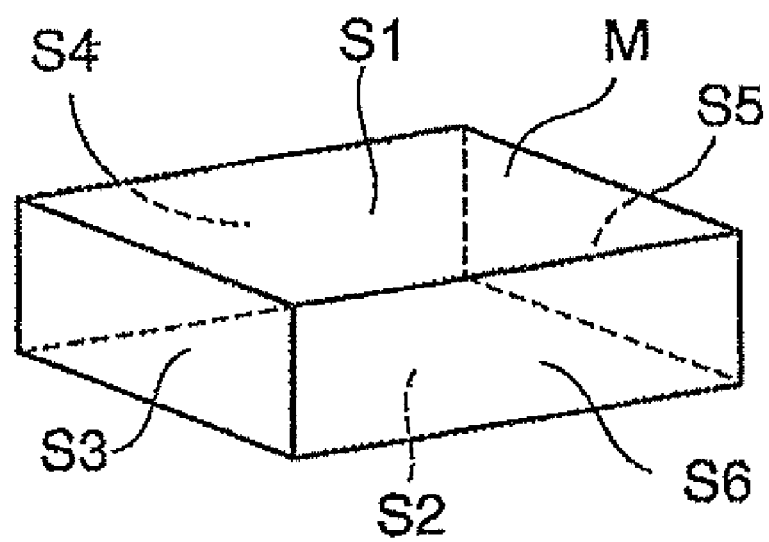
FIG. 7 shows a cuboidal work being machined by the conventional method.

FIG. 6(A) shows the swing arms 18b and 20b at their retreat positions (as shown in FIG. 5), and FIG. 6(B) shows the swing arms 18b and 20b at their pressing position (as shown in FIGS. 1 to 3).

The four swing arms 18b, 18c, 20b, and 20c are designed such that they are moved (swung) independently from each other by hydraulic pressure. Any one of the swing arms may be retreated to the retreat position if it interferes with the working tool (not shown) while the work 10 is being machined. In this way it is possible to avoid interference between the swing arm and the working tool during machining.

The clamping apparatus has a hydraulic source to actuate the swing arms 18b, 18c, 20b, and 20c (attached to the clamping means 18 and 20) and the movable members 18d and 20d. It also has a control unit (not shown) to control the hydraulic source and the motor 24.

The control unit is connected to an operation panel (not shown) provided with control knobs (not shown). In response to the operator's manipulation of control knobs, the clamping apparatus actuates the swing arms 18b, 18c, 20b, and 20c to fix the work or move to the retreat position, the movable members 18d and 20d, and the clamp means 18 and 20 to clamp and unclamp the work.

The foregoing embodiment demonstrates that the work 10 can be entirely fixed by the paired clamp jaws 18a and 20a, which press the opposing two edges of the work 10, and also by the four swing arms 18b, 18c, 20b, and 20c, which push down the opposing surfaces of the work 10. The swing arms certainly prevent the work from displacement and firmly fix the work.

The paired clamping means, no matter how they are arranged, permits the six surfaces of the work to be machined variously once they clamp the work by a single clamping operation.

The foregoing embodiment is not intended to restrict the scope of the present invention. It may be modified such that the paired clamping means 18 and 20 are arranged vertical or horizontal so that the work is turned around the vertical or horizontal axis.

What is claimed is:

1. An apparatus for clamping a rectangular parallelepipedic work to be machined while clamped in the apparatus, said apparatus comprising:
   two supports, spaced along an axis of rotation, each having clamp means capable of indexing the work about the axis of rotation, said clamp means each having a clamp jaw located on the axis of rotation and having a V-shaped clamping groove to clamp and unclamp a respective one of two opposing corners of the work, and wherein each of said clamp means is also provided with a pair of swing arms spaced from the axis of rotation which work in cooperation with the respective clamp jaw such that the swing arms and respective clamp jaw of each clamp means press edges of the work to clamp the work.

2. The apparatus as defined in claim 1, wherein one of the supports includes a built-in motor for performing the indexing.

3. The apparatus as defined in claim 1, wherein the four swing arms independently move between a work pressing position and a retreat position.

* * * * *